United States Patent Office 3,345,252
Patented Oct. 3, 1967

3,345,252
PROCESS OF SIZING CELLULOSIC FIBERS WITH GAMMA-LACTONES AND FIBROUS PRODUCT THEREOF
Van R. Gaertner, Ballwin, Mo., assignor to Monsanto Company, St. Louis, Mo., a corporation of Delaware
No Drawing. Filed Mar. 24, 1965, Ser. No. 442,503
11 Claims. (Cl. 162—158)

This invention relates to sized fibrous products such as cellulosic pulp, paper, carboard, textile threads, fabrics and the like. This invention provides new sized products and process for preparing them.

It has been found, according to this invention that fibrous materials, particularly fibers of cellulose and the like, may be advantageously sized by applying to the fibrous material a compound of the formula

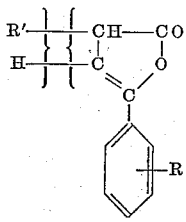

wherein R and R' are each selected from the group consisting of hydrogen and alkyl radicals having from 1 to about 25 carbon atoms, with at least one of R and R' being an alkyl group having at least about 8 carbon atoms, and then drying the thus treated fibrous material. These compounds may be referred to generally as gamma-lactones or gamma-aryl-$\beta$-butenolide compounds. The former nomenclature is preferred by most nomenclature sources. The compounds may be applied by any convenient method known to those skilled in the sizing art but they are most conveniently applied in water-immiscible organic solvent solutions or emulsified aqueous dispersions sufficient to impart from about 0.1 to about 5% or more by weight based on the weight of the dry fiber of the gamma-lactone material used. Not all lactones are useful for this purpose but these compounds have been found to be efficient sizing agents at these low concentrations. Higher concentrations of the gamma-lactone could also be applied to fibrous material if desired but for most practical purposes, higher concentrations are not generally needed. Lower concentrations of the sizing agent than those stated above could also be used to impart at least a degree of water repellant improvement but the range indicated is preferred.

These sizing agents may be prepared by reacting the selected aryl hydrocarbon such as benzene, toluene, xylene, and higher alkyl-substituted benzenes such as pentylbenzene, tridecylbenzene, hexadecylbenzene, eicosylbnzene, pentacosylbenzene, etc. with succinic anhydride or an alkylsuccinic anhydride, such as methyl, pentyl, dodecyl, pentadecyl, octadecyl tetracosylsuccinic anhydrides in the presence of a Friedel-Crafts catalyst such as aluminum chloride, zinc chloride, iron chloride, stannous chloride, etc. to form the respective 3-carboaroyl propionic acid compound, or in general terms, the keto-acid, and then dehydrating the keto-acid obtained, to obtain the respective gamma-lactone. The keto-acid intermediate may be dehydrated by any means known in the art. I prefer to treat it with an economical acid anhydride such as acetic anhydride to remove the water by-product as the acid. It is preferred to separate the gamma-lactone sizing agent from the crude reaction mixture. Conventional purification techniques may be used. For example, I have purified the crude gamma-lactone containing product by washing the reaction mixture with water and with saturated sodium chloride solutions, drying the reaction mixture over a drying agent such as sodium sulfate-magnesium sulfate. The color of the product may sometimes be improved by treating it with a decolorizing charcoal and then filtering off the charcoal. In some cases it may be preferred to purify the keto-acid intermediate prior to dehydrating it to the lactone. After the gamma-lactone product is formed any excess dehydrating agent and water or acid by-product formed may be aspirated off of the product.

These gamma-lactone sizing agents are usually crystalline at room temperature when pure materials have been used to prepare them. However, in commercial practice, usually mixtures of aromatic hydrocarbons and mixtures of alkenyl- and alkylsuccinic anhydrides are used as the reactants in preparing the keto-acid intermediates. The mixed keto-acids and the resulting gamma-lactone mixtures obtained upon dehydrating the mixed keto-acid intermediates are usually difficult to purify extensively. The mixed gamma-lactone products obtained however are nevertheless very useful as sizing agents for fibrous materials, but the products are normally obtained in physical states ranging from crystalline form to viscous liquids depending upon the reactants used and the degree of purification.

These gamma lactones may be applied to fibrous substrates to impart sizing thereto in any conventional manner. The fibrous material in the form of cellulosic pulp, finished paper sheet or paper product, textile fiber, thread, yarn or fabric may be simply dipped into a water immiscible organic solvent solution of the gamma-lactone, and then dried. The amount of gamma-lactone retained by the fibrous substrate can be controlled by the concentration of the solution and the degree of squeezing or pressing of the dipped fibrous material before drying.

This invention also contemplates the use of these sizing agents in conjunction with agents designed to increase retention of the sizing agents by the fibrous substrate such as cellulosic fibers. Useful auxiliary agents of this type include cationic starch, a good example of which is a modified cornstarch having a nitrogen content of about 0.25 percent, sold under the trade name "Cato 8" by National Starch Products Company. When from about 0.1% to about 0.5% by weight, based on the weight of the fibrous substrate, e.g., cellulose pulp, of a cationic starch, such as "Cato 8" is added to the stock slurry before, after, or simultaneously with the sizing agent, a decided improvement in retention of the sizing agent is obtained.

The sizing agents of this invention may also be combined with a cationic emulsifying agent in a water-immiscible organic solvent solution, say, at concentrations of from about 5 percent to 95 percent by weight of the active gamma-lactone sizing agent, together with a small but effective amount, usually in concentrations of from 1 to 5% by weight of a cationic surface active agent, examples of which include the quaternary ammonium salts of long chain amines, such as cetyltriethylammonium chloride, of acyl derivatives of diethylethylenediamine such as the methoxysulfonate of oleoyldiethylmethylethylene-diamine, the alkylbenzyldimethylammonium chloride, etc., in an organic solvent solution, which solution emulsifies well in and is diluted by the aqueous slurries or dispersions of fibrous materials such as cellulosic paper pulp, to which it is added. Solutions of high concentrations of the sizing agent, with or without the retention aid, may be metered by conventional methods to aqueous slurries of fibrous substrates to impart the desired low concentration of sizing agent to the sized fibrous materials.

The effectiveness of these gamma-lactones as sizing agents is illustrated by the following examples.

Example 1

A 15 g. (0.0425 mole) portion of octadecylsuccinic anhydride, prepared by hydrogenating n-octadecenylsuccinic anhydride dissolved in acetic anhydride over palladium-charcoal catalyst, was dissolved in toluene and added to 150 ml. of toluene containing 13.3 g. (0.10 mole) of aluminum chloride at 5–10° C. The temperature was allowed to rise to 20° C. over 30 minutes during which time the aluminum chloride dissolved and further to 40–50° C. for 1 hour while reaction was noted, as evidenced by HCl evolution. The reaction mixture was cooled to 20° C., and poured into an ice water-HCl mixture. An emulsion formed which was broken on adding a hexane-ether mixture. The mixture was allowed to stand overnight and then washed three times with water, twice with a saturated sodium chloride solution, and then dried over sodium sulfate-magnesium sulfate. The color of the liquid reaction mixture was changed from orange-red to light yellow with charcoal. The mixture was filtered, and solvents were aspirated to 100° C., leaving as residium 16.8 g. of mixed acids as a light amber oil which solidified on cooling. Some of the solid product melted at 65°–68° C. and the remainder at 70°–75° C. indicating a mixture of keto acids was obtained, in which the octadecyl radical is alpha and beta to the carboxyl group.

A 15 g. portion of the crude mixed acid was mixed with 50 ml. of acetic anhydride heated to reflux (120–138° C.) with stirring during 1 hour. Excess acetic anhydride and acetic acid were aspirated off to 150° C. pot temperature leaving as residue 13.9 g. of 2(3)-octadecyl-4-tolyl-4-hydroxy-3-butenoic acid, gamma lacetone isomers having the structure

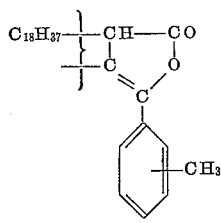

It solidified on cooling.

Example 2

A 49.6 g. portion of an octadecylbenzene mixture, mainly 1-methylheptadecylbenzene, was added at 0°–5° C. to a mixture of 43.9 g. of aluminum chloride in carbon disulfide which had been treated with 16.0 g. of succinic anhydride. The temperature was raised to 20° C. and reaction was noted. The mixture was stirred for two hours to insure complete reaction at a maximum of 25° C. and then poured into an ice water-HCl mixture to give an off-white suspension. The mixture was extracted with ether, washed with water, saturated sodium chloride solution, and filtered. The filtrate was distilled to remove some of the solvents to leave as residue 64.2 g. of keto acid solution which solidified upon cooling. The solid was redissolved in hexane and extracted with 5% potassium hydroxide solution to remove a small amount of acidic material; the purified acid was isolated by removing the solvent. A 57.0 g. portion of the crude keto acid was heated sufficiently to dissolve in 102 g. of acetic anhydride and then heated to reflux for 2 hours. The clear dark red solution was aspirated to 160° C. leaving 59.3 g. of crude product. A sample of the product would not distill up to 340° C. at 1 mm. pressure. The product was dissolved in hexane, decolorized with charcoal and filtered. There was obtained 31.9 g. of red brown 4-octadecylphenyl-4-hydroxy-3-butenoic acid, gamma-lacetone, having the formula

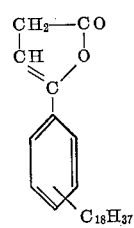

Example 3

Pieces of unsized cellulosic paper were dipped into a 0.35% by weight solution of 5-octadecylphenyl-4-hydroxy-3-butenolactone in chloroform and then dried by one of the following methods.

A. The treated paper was air dried overnight.
B. The treated paper was dried in a forced air oven for 60 minutes at 105° C.
C. The treated paper was dried in a forced air oven for 60 minutes at 105° C. using triethylenediamine, "Dabco," as a catalyst.

Some of the dried treated sheets were further immersed in an acetone bath for 24 hours and re-dried.

The dried treated sheets were tested for sizing by forming a small flat bottomed boat of the treated paper and floating the treated paper boat on a standard ink bath at constant temperature and humidity. The time, in seconds, for the first indication of ink on observed surface is noted. The results of this test were as follows:

| | Sizing-Ink Flotation Method (Seconds) | |
|---|---|---|
| | "As Is" [1] | Washed |
| Drying Method: | | |
| A | 203 | 58 |
| B | 1,230 | 900 |
| C | 643 | 500 |
| Control [2] | >0 | >0 |

[1] "As Is" indicates that the treated paper was dried but not washed in acetone.
[2] Control indicates an untreated piece of the same paper which was immersed in water, and dried as the samples. >0 indicates practically instantaneous observation of the ink on the observed surface of the control paper samples.

These data illustrates the substantial sizing effectiveness of these compounds on cellulosic fibrous materials. Retention of sizing after washing confirms that a substantial part of this sizing is due to reaction with the cellulose and may be termed "permanent."

I claim:

1. A fibrous product comprising cellulose fibers having applied thereto about 0.1 percent to about 5 percent by weight of the dry fibers of a compound of the formula

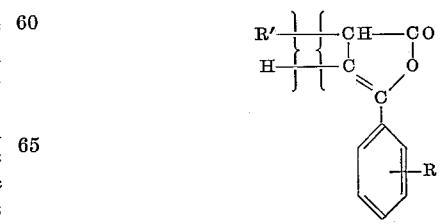

wherein R and R' are each selected from the group consisting of hydrogen and alkyl groups having from 1 to about 25 carbon atoms, with at least one of said R and R' being an alkyl group of at least about 8 carbon atoms.

2. A paper product comprising sized cellulose fibers containing about 0.3 percent to about 5 percent by weight of a sizing agent wherein the effective sizing agent is a compound of the formula

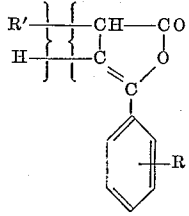

wherein R and R' are each selected from the group consisting of hydrogen and alkyl groups having from 1 to about 25 carbon atoms with at least one of said R and R' being an alkyl group of at least about 8 carbon atoms.

3. A sized paper product as described in claim 2 wherein the sizing agent is a 2(3)-alkyl-4-alkylphenyl-3-butenolactone having from 1 to 25 carbon atoms in each alkyl group.

4. A sized paper product as described in claim 3 wherein the sizing agent is 2(3)-octadecyl-4-tolyl-3-butenolactone.

5. A sized paper product as described in claim 2 wherein the sizing agent is a 4-alkylphenyl-3-butenolactone.

6. A sized paper product as described in claim 5 wherein the sizing agent is 4-octadecylphenyl-3-butenolactone.

7. A method of preparing a sized fibrous product of cellulose fibers which comprises applying to the cellulose fibrous product from about 0.1 to about 5 percent by weight on the dried cellulose fibers of a sizing agent which is a compound of the formula

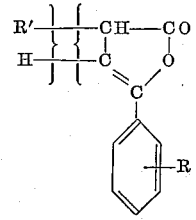

wherein R and R' are each selected from the group consisting of hydrogen and alkyl having from 1 to about 25 carbon atoms, with at least one of R and R' being an alkyl group having at least about 8 carbon atoms, and drying the thus treated cellulosic fibrous product.

8. A method as described in claim 7 wherein the cellulose fibrous product is a paper product and in the sizing agent each of R and R' is an alkyl group having from 1 to about 25 carbon atoms.

9. A method of preparing a sized paper product as described in claim 8 wherein the sizing agent is 2(3)-octadecyl-4-tolyl-3-butenolactone.

10. A method as described in claim 7 wherein in the sizing agent R is alkyl having from 8 to 25 carbon atoms and R' is hydrogen.

11. A method as described in claim 10 wherein the sizing agent is 4-octadecylphenyl-3-butenolactone.

References Cited
UNITED STATES PATENTS

| | | | |
|---|---|---|---|
| 3,025,323 | 3/1962 | Rose et al. | 162—158 X |
| 3,139,373 | 6/1964 | Liggett | 162—158 X |
| 3,155,685 | 11/1964 | Prill et al. | 260—343.6 X |

S. LEON BASHORE, *Primary Examiner.*